(12) United States Patent
Nihashi

(10) Patent No.: US 6,314,759 B1
(45) Date of Patent: Nov. 13, 2001

(54) METHOD OF BONDING GLASS MEMBERS

(75) Inventor: Tokuaki Nihashi, Shizuoka-ken (JP)

(73) Assignee: Hamamatsu Photonics K.K., Hamamatsu (JP)

( * ) Notice: Subject to any disclaimer, the term of this patent is extended or adjusted under 35 U.S.C. 154(b) by 0 days.

(21) Appl. No.: 09/355,102

(22) PCT Filed: Jul. 10, 1998

(86) PCT No.: PCT/JP98/03105
§ 371 Date: Jul. 23, 1999
§ 102(e) Date: Jul. 23, 1999

(87) PCT Pub. No.: WO99/05073
PCT Pub. Date: Feb. 4, 1999

(30) Foreign Application Priority Data

Jul. 23, 1997 (JP) .................................................. 9-197229

(51) Int. Cl.$^7$ ............................ C03C 27/00; C03C 29/00
(52) U.S. Cl. .............................. 65/43; 65/60.2; 65/60.8; 156/89.11; 156/99
(58) Field of Search .................. 156/89.11, 99; 65/43, 60.2, 60.8

(56) References Cited

U.S. PATENT DOCUMENTS

| | | | |
|---|---|---|---|
| 3,962,597 | * | 6/1976 | Clark et al. . |
| 4,608,293 | * | 8/1986 | Wada et al. ........................... 428/141 |
| 5,038,242 | * | 8/1991 | Fukushima et al. ................. 360/120 |
| 5,267,113 | * | 11/1993 | Matsushita et al. ................. 360/127 |
| 5,683,480 | * | 11/1997 | Taniguchi ............................... 65/17.2 |
| 5,725,626 | | 3/1998 | Taniguchi ................................. 65/37 |
| 5,785,874 | * | 7/1998 | Eda ......................................... 216/24 |
| 5,834,885 | * | 11/1998 | Itoh et al. ............................. 313/336 |
| 5,876,614 | * | 3/1999 | Zhou et al. . |

FOREIGN PATENT DOCUMENTS

| | | |
|---|---|---|
| 48-032171 | 10/1973 | (JP) . |
| 51-024612 | 2/1976 | (JP) . |
| 62-297247 | 12/1987 | (JP) . |
| 62-297369 | 12/1987 | (JP) . |
| 62-297370 | 12/1987 | (JP) . |
| 63-379 | 1/1988 | (JP) . |
| 2-92685 | 4/1990 | (JP) . |
| 5-56789 | 3/1993 | (JP) . |

OTHER PUBLICATIONS

Kingery et al, Introduction to Ceramics, p. 630, section 12.5, 1976.*

* cited by examiner

Primary Examiner—Michael Colaianni
(74) Attorney, Agent, or Firm—Morgan, Lewis & Bockius LLP (57) ABSTRACT

After a film made of $SiO_2$ is formed on at least a part of a bonding surface of a first glass member, a part of or the whole bonding surface being formed with a metal film, a second glass member is hot-pressed against the bonding surface at a predetermined pressure and a predetermined temperature. As the second glass member is hot-pressed by way of the $SiO_2$ film against the bonding surface of the first member made of glass or the like having its bonding surface formed with a metal film, the two glass members are firmly bonded together, the bonding surface would be less likely to peel off, and the metal film would not be damaged.

17 Claims, 11 Drawing Sheets

METHOD OF BONDING GLASS MEMBERS

Technical Field

The present invention relates to a method of bonding glass members for bonding a bonding surface of a member made of glass or the like, a part of or the whole bonding surface being formed with a metal film, to another glass member.

Background Art

As a method of bonding glass members, there have conventionally been known a method in which they are bonded together by fusion therebetween, a method in which they are bonded to each other by way of low-melting glass, a method in which an organic adhesive is used for bonding, and the like. The bonding method by fusion between glass members is a method comprising the steps of mirror-polishing the bonding surfaces of glass members, and then holding them by closely pressing them against each other at an appropriate temperature, so that the glass members are mutually fused together. The bonding method by way of low-melting glass is a method comprising the steps of interposing between glass members at a specific bonding temperature the low-melting glass having a viscosity lower than that of the glass members to be bonded together, and then bonding the glass members together by annealing. The bonding method by use of an organic adhesive is a method in which an organic adhesive such as polyvinyl butyral is interposed between the bonding surfaces of glass members, so that the glass members are bonded together. Using these methods can firmly bond the glass members together.

Disclosure of the Invention

Figure 24:
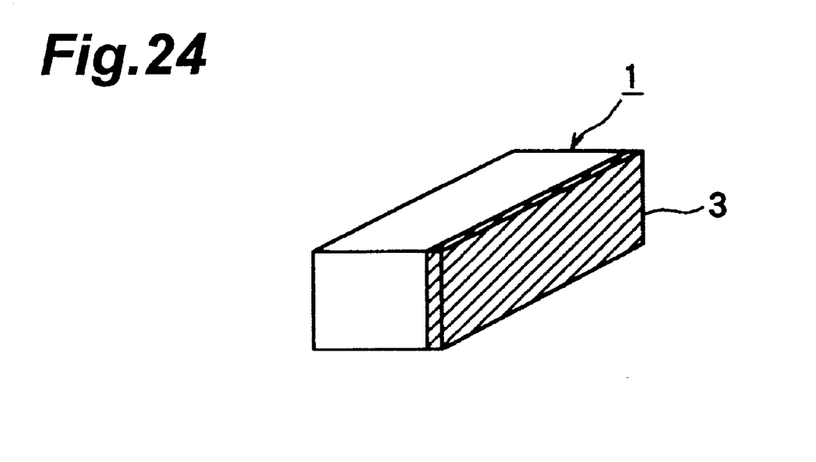
FIG. 24 is a view showing a glass member constituting lan optical window having striped reflecting layers.
Figure 25:
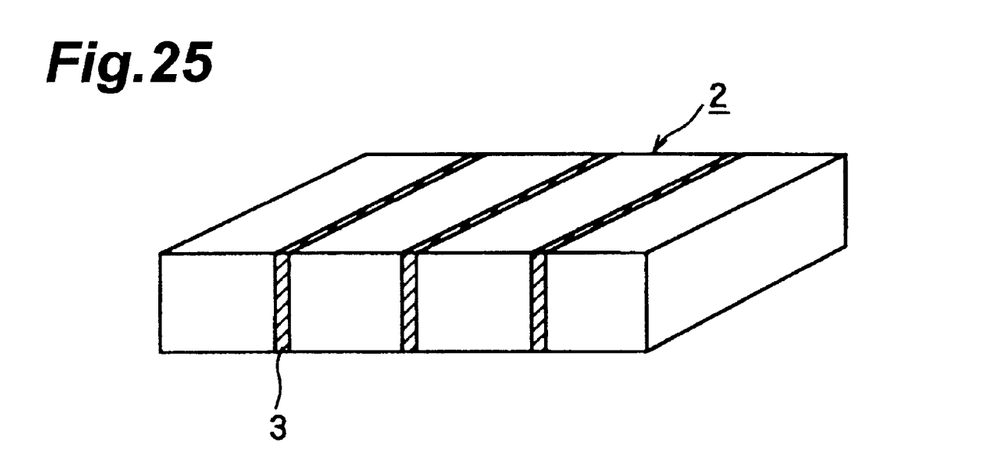
FIG. 25 is a final view of the optical window having the striped reflecting layers.

Meanwhile, the recent progress in thin-film forming technique has been remarkable, thus making it possible to form a metal film on surfaces of glass members. A glass member having a surface formed with a metal film has become one which can be utilized as a variety of optical components, since the metal film acts as a reflecting layer. For example, when a plurality of glass members 1 each having a surface formed with a metal film 3 as shown in FIG. 24 are arranged side by side and bonded together, an optical window 2 having a stripe-like reflecting layer such as that shown in FIG. 25 can be formed. For example, the optical window 2 having a stripe-like reflecting layer is connected to the light entrance face of a photomultiplier and used for detecting the light intensity at each entrance position of light.

When a method indicated in the above-mentioned background art is used in the case where a glass member having a surface formed with a metal film is to be bonded to another glass member, however, there may be seen such a phenomenon that their bonding surfaces easily peel off or the metal film is damaged and thereby fails to act as a reflecting layer. As a consequence, optical components such as optical windows or electron tubes made by use of the above-mentioned conventional methods have been inferior in terms of durability, thus being problematic in practice.

Therefore, it is an object of the present invention to provide a method of bonding glass members which overcomes the above-mentioned problems and, when a bonding surface of a member such as glass having the bonding surface formed with a metal film is to be bonded to another glass member, the bonding surface would not easily peel off and the metal film would not be damaged.

In order to achieve the above-mentioned object, the method of bonding glass members in accordance with the present invention comprises the steps of forming a film made of $SiO_2$ on at least a part of a bonding surface of a first member made of glass or the like, a part of or the whole bonding surface being formed with a metal film; and then hot-pressing a second glass member against the bonding surface at a predetermined pressure and a predetermined temperature.

As the second glass member is hot-pressed by way of the $SiO_2$ film against the bonding surface of the first member made of glass or the like having its bonding surface formed with a metal film, the two glass members are firmly bonded together, the bonding surface would be less likely to peel off, and the metal film would not be damaged.

In the method of bonding glass members in accordance with the present invention, the film made of $SiO_2$ may be formed by CVD technique (chemical vapor deposition technique).

In the method of bonding glass members in accordance with the present invention, the second glass member may be made of glass containing at least one kind of alkali element, while the difference between the coefficient of thermal expansion of the first member made of glass or the like and the coefficient of thermal expansion of the second glass member may be within the range of $-1.0-10^{-6}$ to $+1.0 \times 10^{-6}/°C$.

In the method of bonding glass members in accordance with the present invention, the first member made of glass or the like is preferably formed from a material selected from the group consisting of glass, sapphire, spinel, ceramics, silicon, and group III-V compound semiconductors.

Best Modes for Carrying Out the Invention

The method of bonding glass members in accordance with an embodiment of the present invention will be explained with reference to the drawings. The method of bonding glass members in accordance with this embodiment comprises a first step of forming a film made of $SiO_2$ on a bonding surface of a first glass member formed with a metal film; and a second step of superposing and hot-pressing a second member onto the bonding surface of the first glass member formed with the $SiO_2$ film in the first step. In the following, the individual steps will be explained in sequence.

To begin with, the first step will be explained. The first glass member 10 used in the method of bonding glass members in accordance with this embodiment is made of glass containing at least one kind of alkali element and has a form such as that shown in FIG. 2. Namely, it is a planar glass member having a bonding surface formed with a metal film, e.g., a Cr film 12. The Cr film 12 is formed with a uniform thickness of about 1000 Å.

Figure 3:
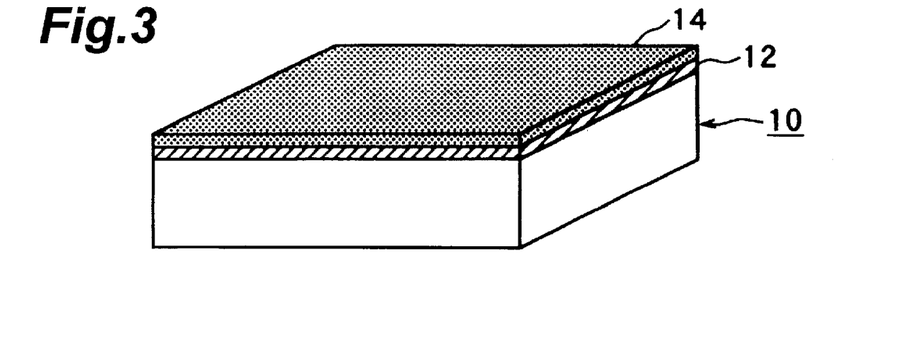
FIG. 3 is a view showing the first step in the method of bonding glass members in accordance with the embodiment of the present invention.

In this step, on the Cr film 12 formed on the bonding surface of the first glass member 10, $SiO_2$ is vapor-deposited by use of CVD technique, so as to form an $SiO_2$ film 14 having a thickness of about 1000 Å. As a result, the first glass member 10 yields a structure such as that shown in FIG. 3.

Figure 4:
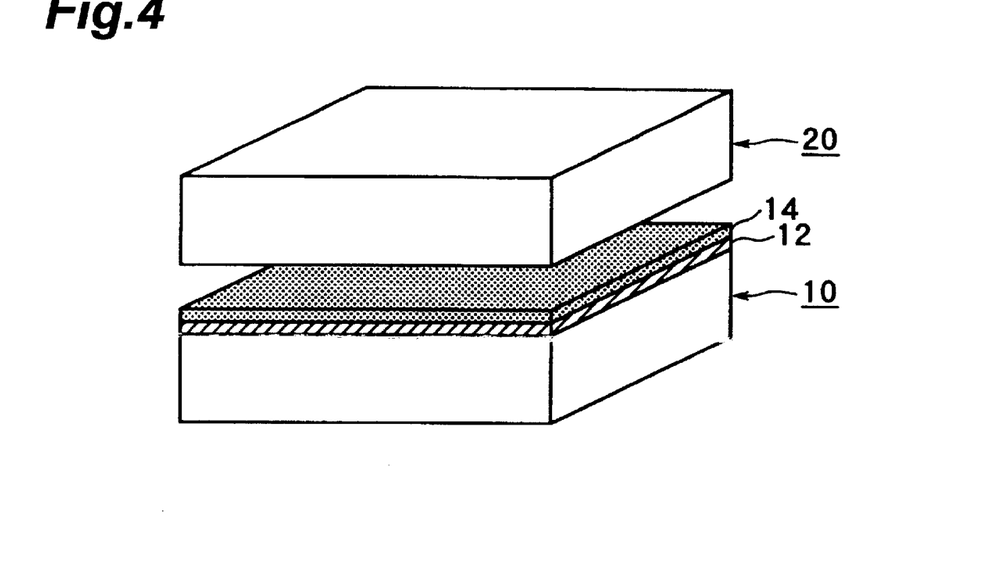
FIG. 4 is a view showing the second step in the method of bonding glass members in accordance with the embodiment of the present invention.

The second step will now be explained. Initially, in this step, the first glass member 10 formed with the $SiO_2$ film 14 on the bonding surface in the first step and the second glass member 20 are arranged one above the other as shown in FIG. 4 and are inserted into a vacuum heat treatment furnace. Here, though the first glass member 10 and the second glass member 20 may be stacked one upon the other, it is preferred that a gap be formed, as shown in FIG. 4, between the first glass member 10 and the second glass member 20 until a degassing process is completed in order to eliminate gas clinging on their bonding surfaces. Also, in terms of material, it is preferred that the difference between the coefficient of thermal expansion of the first glass member 10 and the coefficient of thermal expansion of the second glass member 20 be within the range of $-1.0 \times 10^{-6}$ to $+1.0 \times 10^{-6}/°$ C.

Figure 1:
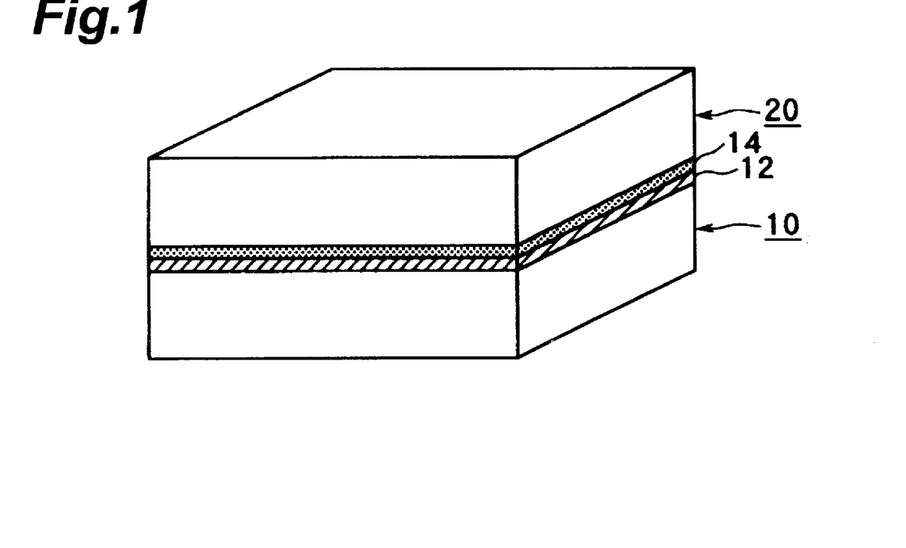
FIG. 1 is a view showing the state of planar glass members bonded by the method of bonding glass members in accordance with an embodiment of the present invention.

After the completion of degassing process, the first glass member 10 and the second glass member 20 are stacked one upon the other such that their bonding surfaces are in close contact with each other and, with the temperature within the furnace being set close to yielding point temperatures of the first glass member 10 and second glass member 20, they are held in close contact with each other for 30 minutes to an hour under a loading pressure of 100 to 200 g/cm$^2$, so as to be hot-pressed against each other. The hot-pressed first glass member 10 and second glass member 20 are mutually bonded to each other as shown in FIG. 1, whereby a bonded body is formed.

The bonding surfaces of the two glass members bonded by this method do not easily peel off from each other, whereby they can be used for making various kinds of optical components having metal reflecting films, electrodes, or the like. In the following, specific examples in which the method of bonding glass members in accordance with this embodiment is used for making optical components will be explained.

First Specific Example

The first specific example is a method of making an optical window having a stripe-like reflecting layer in which the method of bonding glass members in accordance with the embodiment of the present invention is used. For making the optical window having a stripe-like reflecting layer, a planar glass member 10 is initially washed, and then Cr is vapor-deposited on one of main surfaces thereof by use of CVD technique, so as to form a Cr film 12 having a thickness of about 1000 Å. As a result, the planar glass member 10 yields a structure such as that shown in FIG. 2.

Subsequently, an $SiO_2$ film 14 is formed on the Cr film 12. As explained in the column of the first step in the above-mentioned embodiment, the $SiO_2$ film 14 is formed by vapor-depositing $SiO_2$ on the Cr film 14 by use of CVD technique. The planar glass member 10 formed with the $SiO_2$ film 14 yields a structure such as that shown in FIG. 3.

Figure 5:
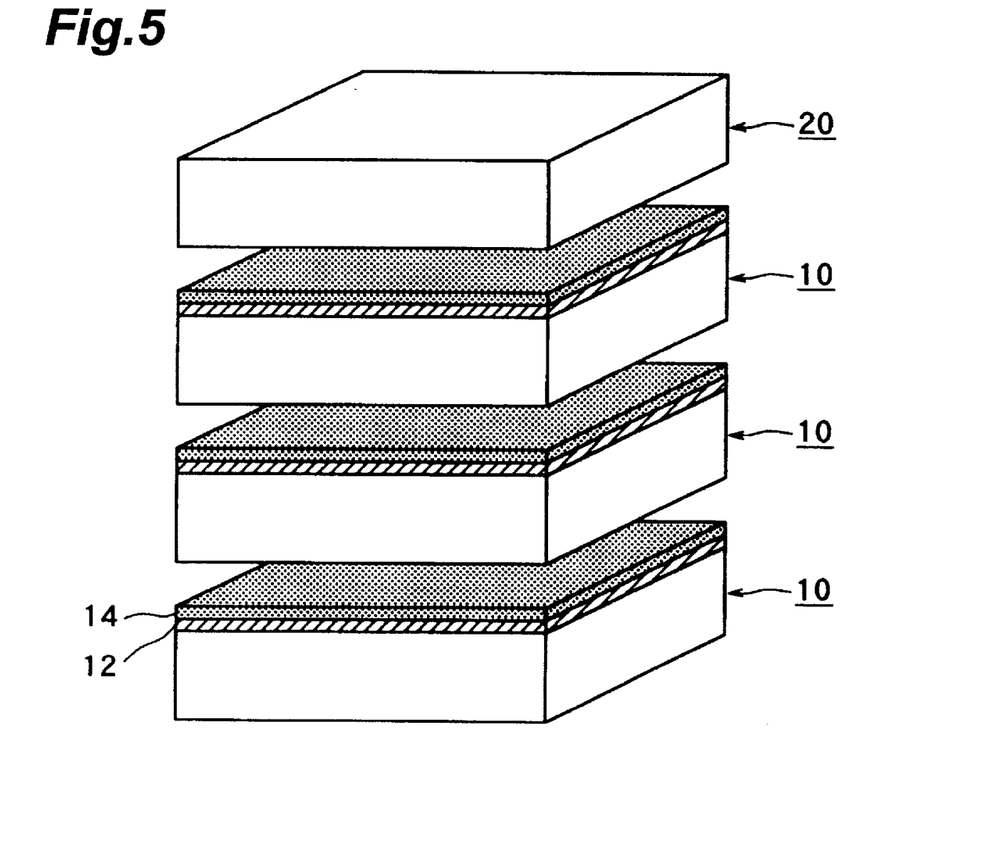
FIG. 5 is a view showing a step of making an optical window having striped reflecting layers in accordance with a first specific example of the present invention.

Subsequently, a number of planar glass members 10, each formed with the Cr film 12 and the $SiO_2$ film 14, are arranged as being stacked one upon another as shown in FIG. 5. The number of stacked planar glass members 10 is determined by the number of pixels of the electron tube for which the optical windows are used as being bonded together, whereas the thickness of the planar glass member 10 used is determined by the resolution of the electron tube. Also, the area of the planar glass member 10 used is determined by the dimensions of the optical windows to be manufactured, the number thereof, and the like.

Figure 6:
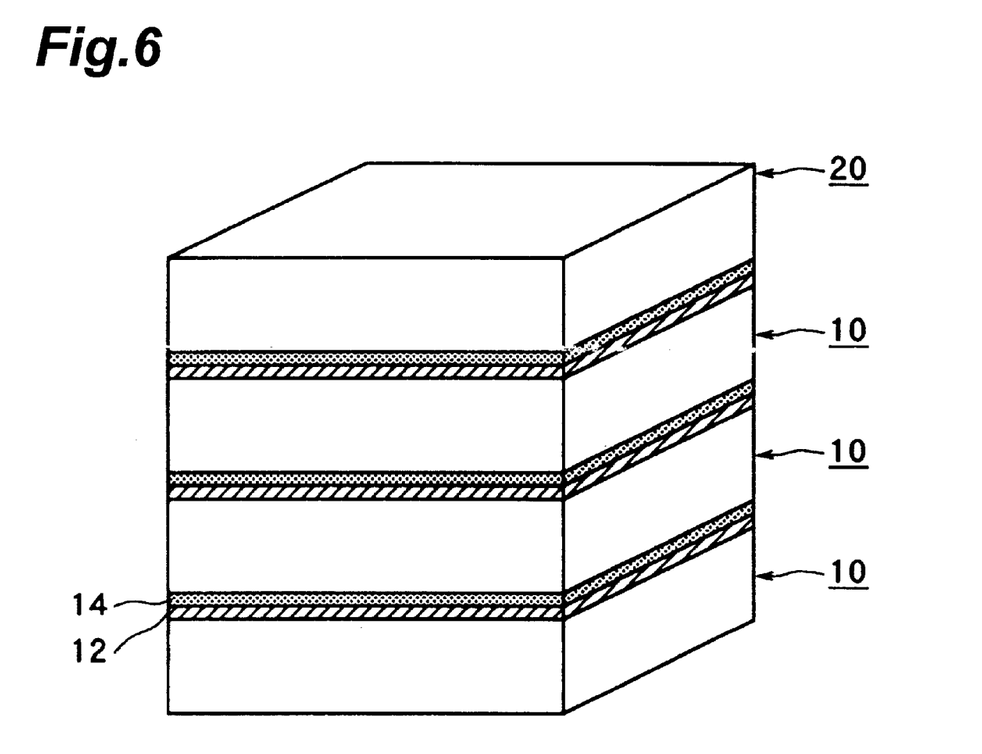
FIG. 6 is a view showing a step of making the optical window having the striped reflecting layers in accordance with the first specific example of the present invention.

Further, a number of planar glass members 10 arranged as shown in FIG. 5 are inserted into a vacuum heat treatment furnace and are hot-pressed together. Specifically, as explained in conjunction with the second step in the above-mentioned embodiment, the above-mentioned number of planar glass members 10 are stacked one upon another such that their bonding surfaces are in close contact with one another and, with the temperature within the furnace being set close to the yielding point temperature of the glass members 10, they are held in close contact with one another for 30 minutes to an hour under a loading pressure of 100 to 200 g/cm$^2$, so as to be hot-pressed against one another. Thus hot-pressed number of planar glass members 10 yield a bonded body such as that shown in FIG. 6.

Figure 7:
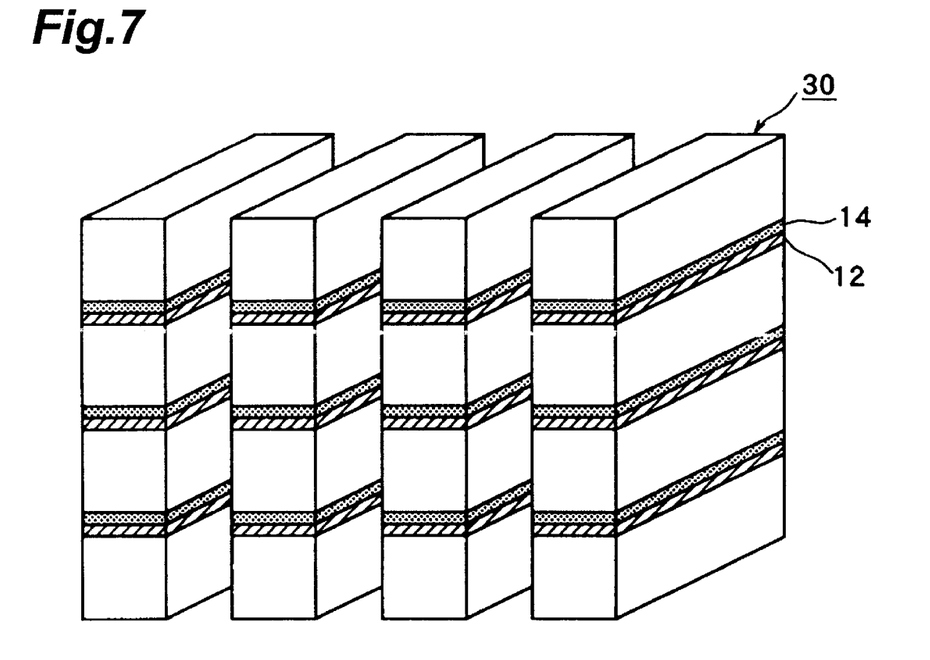
FIG. 7 is a view showing a step of making the optical window having the striped reflecting layers in accordance with the first specific example of the present invention.
Figure 8:
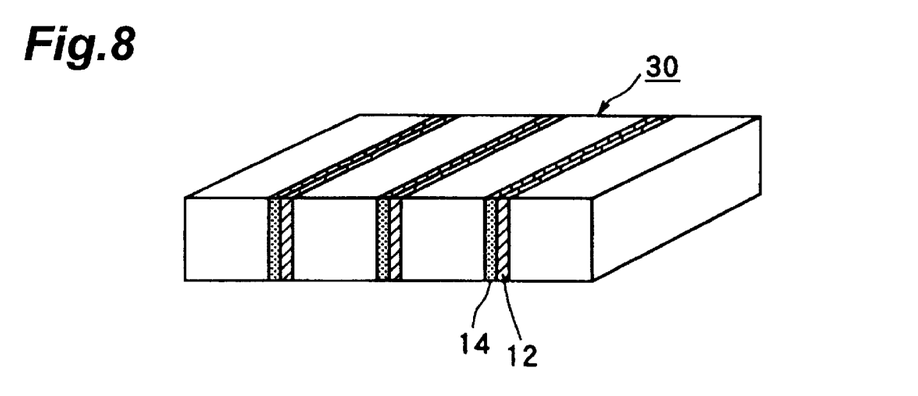
FIG. 8 is a final view of the optical window having the striped reflecting layers in accordance with the first specific example of the present invention.

Subsequently, the bonded body of hot-pressed glass members 10 is cut perpendicularly with respect to the pressed surfaces as shown in FIG. 7. Thus cut one piece becomes an optical window 30 having a stripe-like reflecting layer having a form such as that shown in FIG. 8, and is used as an optical window for an electron tube.

Figure 2:
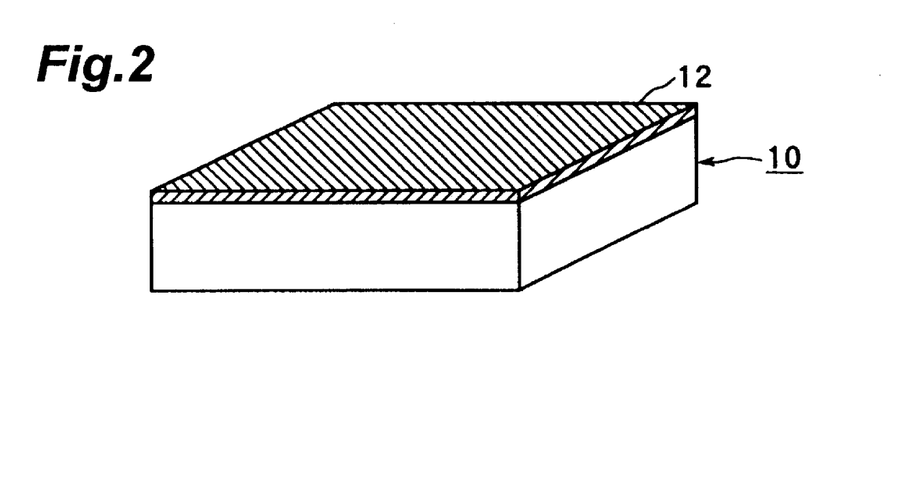
FIG. 2 is a view showing a planar glass member used in the method of bonding glass members in accordance with the embodiment of the present invention.
Figure 9:
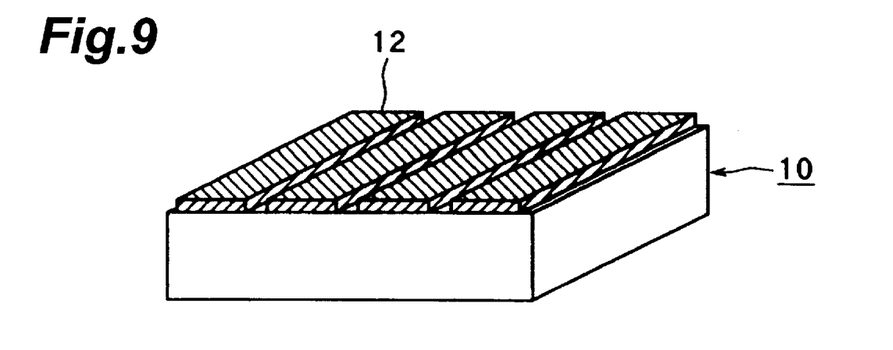
FIG. 9 is a view showing a step of making an optical window having striped reflecting layers in accordance with the first specific example of the present invention.
Figure 10:
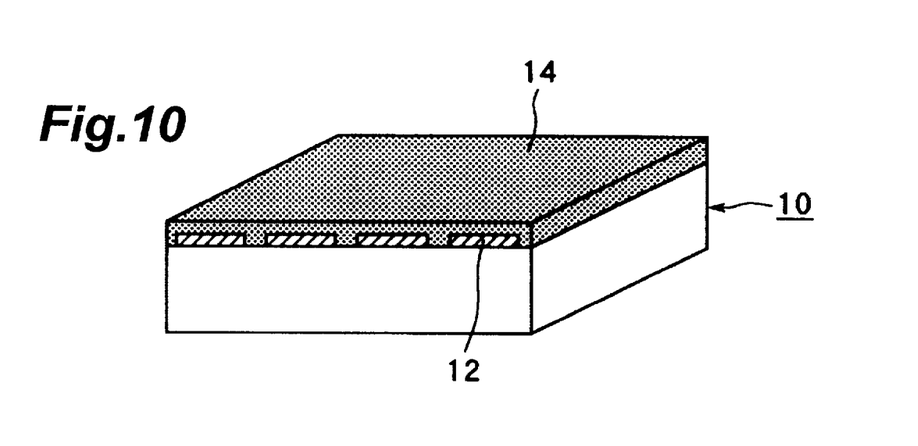
FIG. 10 is a view showing a step of making the optical window having the striped reflecting layers in accordance with the first specific example of the present invention.
Figure 11:
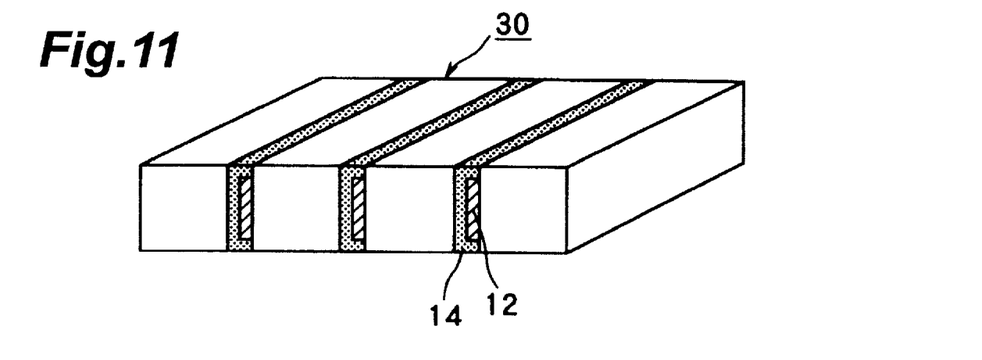
FIG. 11 is a final view of the optical window having the striped reflecting layers in accordance with the first specific example of the present invention.

Though the glass member 10 having the whole bonding surface formed with the Cr film 12 as shown in FIG. 2 is used for forming the optical window 30 having a stripe-like reflecting layer in the first specific example, a glass member 10 in which Cr films 12 are formed into split rectangular portions as shown in FIG. 9 without covering the whole bonding surface may be used instead. When an SiO$_2$ film is formed on the upper face of such a glass member 10, the latter attains a form such as that shown in FIG. 10. When such glass members are bonded together as being stacked one upon another, and are cut perpendicularly with respect to their bonding surfaces such that the cutting surfaces would not intersect the Cr films 12, an optical window 30 having a striped reflecting layer such as that shown in FIG. 11 is formed. In the optical window 30 having a stripelike reflecting layer such as that shown in FIG. 11, since the metal reflecting film (Cr film 12) is not exposed to its light entrance face or the face opposed thereto, no consideration would be needed for the electric short-circuiting caused by the reflecting layer when used as being bonded to an electron tube or the like.

Second Specific Example

Figure 12:
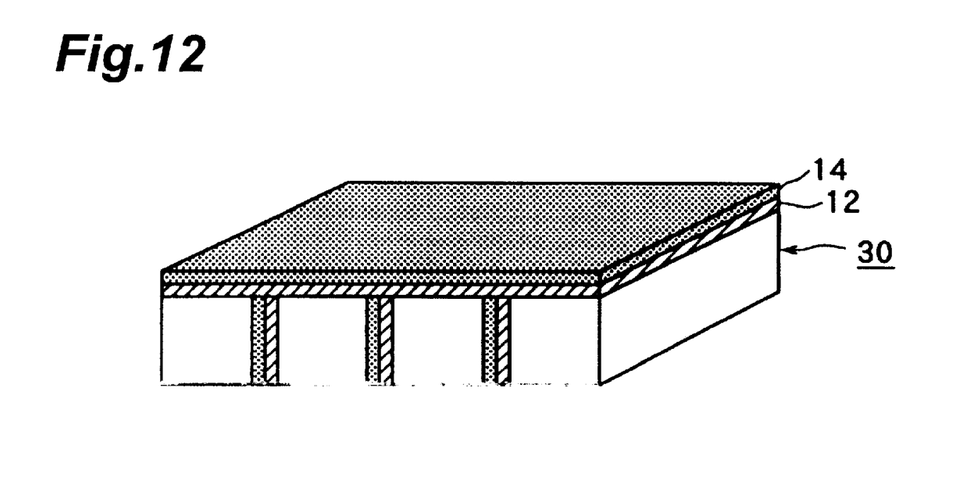
FIG. 12 is a view showing a step of making the optical window having grating-like reflecting layers in accordance with a second specific example of the present invention.

The second specific example is a method of making an optical window having a grating-like reflecting layer by using the method of bonding glass members in accordance with the embodiment of the present invention. For forming the optical window having the grating-like reflecting layer, the optical window 30 having the stripe-like reflecting layer prepared in the first specific example is used. On one of the main surfaces of the optical window 30 having the stripe-like reflecting layer, a Cr film 12 and an SiO$_2$ film 14 are successively formed by use of CVD technique. The Cr film 12 and SiO$_2$ film 14 each have a thickness of about 1000 Å. The optical window 30 having the stripe-like reflecting layer and one of its main surfaces formed with the Cr film 12 and SiO$_2$ film 14 would have a form such as that shown in FIG. 12.

Figure 13:
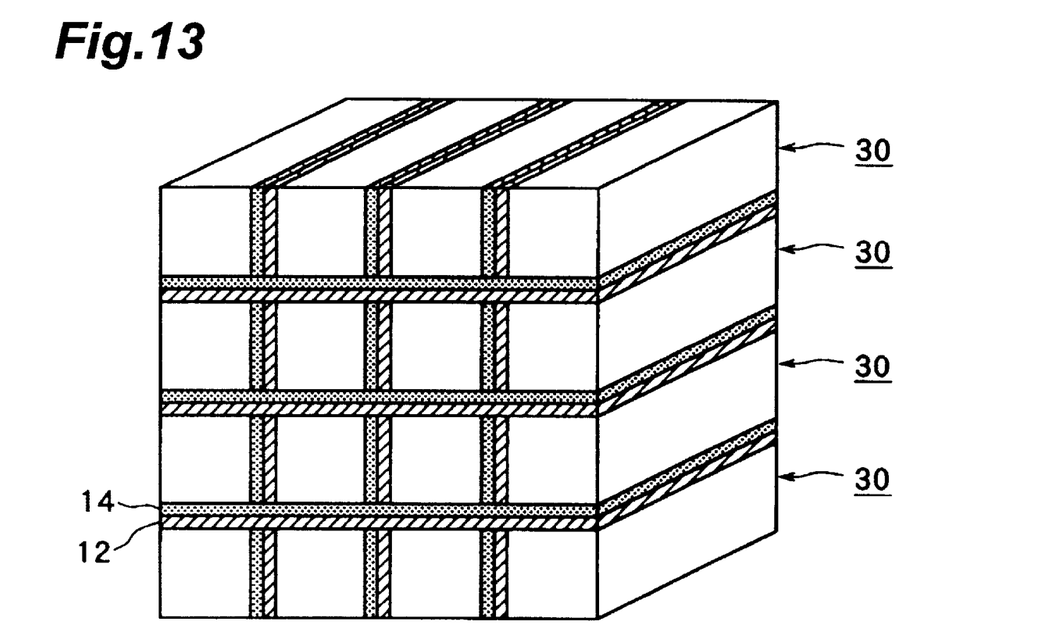
FIG. 13 is a view showing a step of making the optical window having the grating-like reflecting layers in accordance with the second specific example of the present invention.

Subsequently, a number of optical windows 30, each having a stripe-like reflecting layer and formed with the Cr film 12 and the SiO$_2$ film 14, are stacked one upon another and hot-pressed. Specifically, as explained in conjunction with the second step in the above-mentioned embodiment, the above-mentioned number of planar glass members 10 are stacked one upon another such that their bonding surfaces are in close contact with one another in a vacuum heat treatment furnace and, with the temperature within the furnace being set close to the yielding point temperature of the glass members 10, they are held in close contact with one another for 30 minutes to an hour under a loading pressure of 100 to 200 g/cm$^2$, so as to be hot-pressed against one another. As a result, a number of optical windows 30 having stripe-like reflecting layers are mutually bonded together, so as to form a bonded body such as that shown in FIG. 13.

Figure 14:
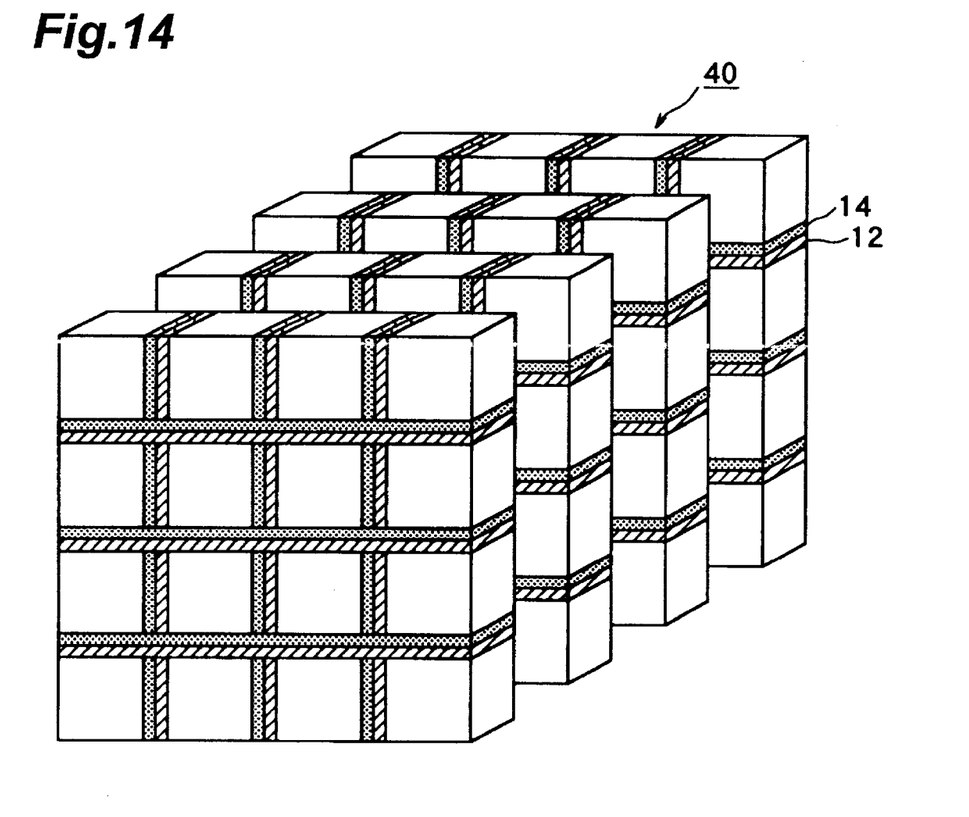
FIG. 14 is a view showing a step of making the optical window having the grating-like reflecting layers in accordance with the second specific example of the present invention.
Figure 15:
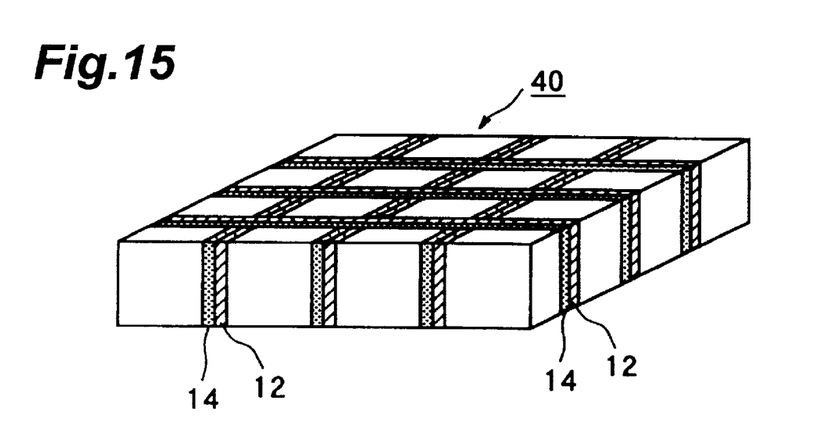
FIG. 15 is a final view of the optical window having the grating-like reflecting layers in accordance with the second specific example of the present invention.

When the bonded body is cut so as to have cutting surfaces perpendicular to both of the bonding surfaces of the glass members 10 and the bonding surfaces of the optical windows 30 having stripe-like reflecting layers as shown in FIG. 14, an optical window 40 having a grating-like reflecting layer such as that shown in FIG. 15 is yielded. The optical window 40 having a grating-like reflecting layer has a grating-like reflecting layer formed by Cr and is used as an optical window for an electron tube.

Third Specific Example

The third specific example is a method of making an electron tube utilizing the method of bonding glass members in accordance with the embodiment of the present invention. This example is similar to the above-mentioned first specific example until after the Cr film 12 and the SiO$_2$ film 14 are formed on the planar glass member 10.

Figure 16:
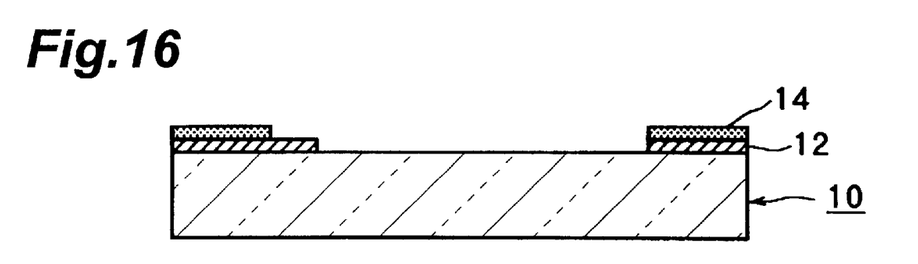
FIG. 16 is a view showing a step of making an electron tube in accordance with a third specific example of the present invention.

Then, lithography technique is used for etching the Cr film 12 and SiO$_2$ film 14 into their predetermined forms. HF or the like may be used for etching SiO$_2$, whereas a mixture of cerium(IV) ammonium nitrate and perchloric acid and water or a mixture of red prussiate and NaOH (or KOH) and water may be used for etching Cr. As a result of etching, the planar glass member 10 would have a form such as that shown in FIG. 16.

Figure 17:
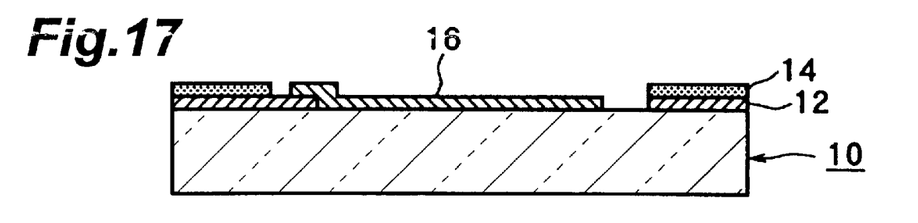
FIG. 17 is a view showing a step of making the electron tube in accordance with the third specific example of the present invention.

After the etching, an electrode metal material 16 for a cathode or anode is formed into a predetermined shape by CVD technique or another vapor deposition technique. Here, examples of the electrode metal material 16 include Ni, Mg, Ag, Sn, Au, and the like. As a result, the planar glass member 10 would have a form such as that shown in FIG. 17.

Figure 18:
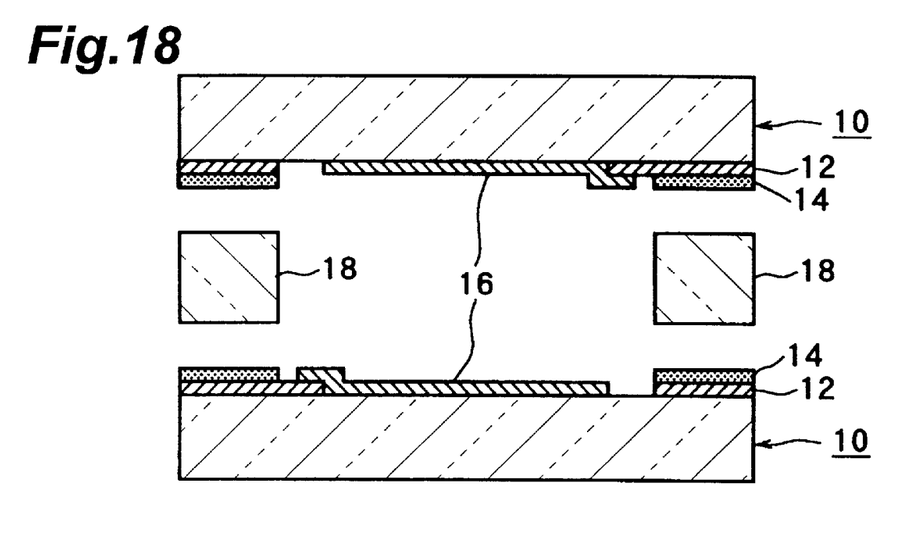
FIG. 18 is a view showing a step of making the electron tube in accordance with the third specific example of the present invention.

Subsequently, planar glass members 10 each having the electrode metal material 16 for a cathode or anode deposited thereon are arranged as shown in FIG. 18 by use of glass supports 18.

Thereafter, as explained in conjunction with the second step in the above-mentioned embodiment, two planar glass members 10 and glass supports 18 are stacked one upon another in a vacuum heat treatment furnace such that their bonding surfaces are in close contact with one another and, with the temperature within the furnace being set close to the yielding point temperature of the glass members 10, they are held in close contact with one another for 30 minutes to an hour under a loading pressure of 100 to 200 g/cm$^2$, so as to be hot-pressed against one another.

Figure 19:
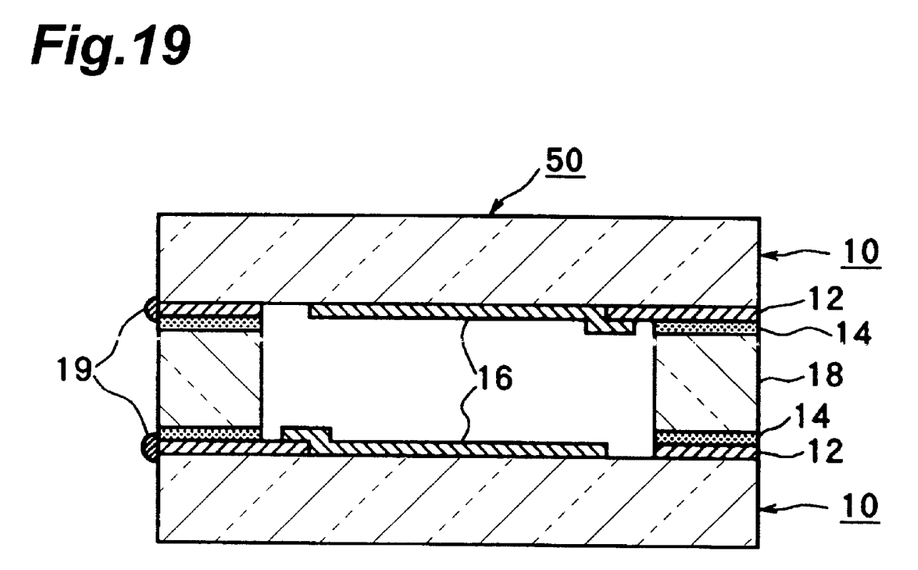
FIG. 19 is a final view showing the electron tube in accordance with the third embodiment.

Finally, external electrodes 19 are drawn to parts of the Cr films 12, whereby an electron tube 50 is formed as shown in FIG. 19.

Fourth Specific Example

The fourth specific example is a method of making an electron tube utilizing the method of bonding glass members in accordance with the embodiment of the present invention.

Figure 20:
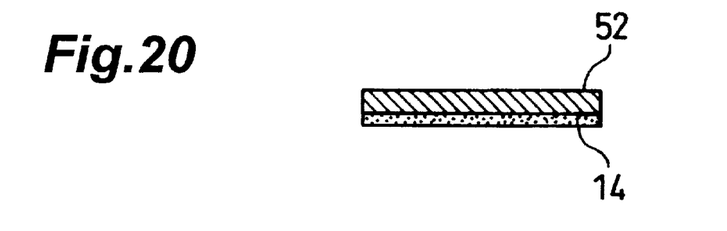
FIG. 20 is a view showing a step of making an electron tube in accordance with a fourth specific example of the present invention.

Initially, in this method, as shown in FIG. 20, an SiO$_2$ film 14 is formed on a bonding surface of a planar member 52 made of GaAs semiconductor crystal which acts as a material for a cathode. As with the first specific example, the $SiO_2$ film 14 is formed by a method in which CVD technique is used for vapor-depositing $SiO_2$ on the bonding surface of the planar member 52.

Figure 21:
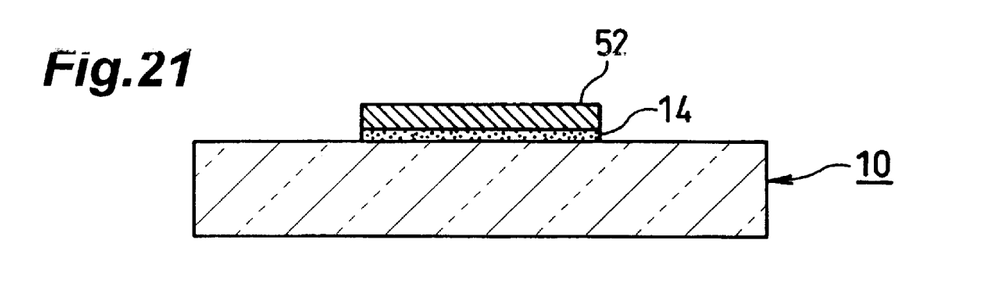
FIG. 21 is a view showing a step of making the electron tube in accordance with the fourth specific example of the present invention.

Then, as shown in FIG. 21, the planar member 52 and a glass support 10 are stacked one upon the other in a vacuum heat treatment furnace such that their bonding surfaces are in close contact with each other and, with the temperature within the furnace being set close to the yielding point temperature of the glass members 10, they are held in close contact with each other for 30 minutes to an hour under a loading pressure of 100 to 200 $g/cm^2$, so as to be hot-pressed against each other.

Figure 22:
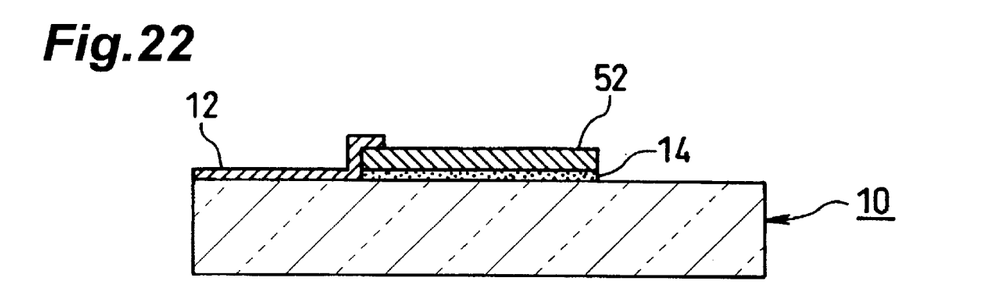
FIG. 22 is a view showing a step of making the electron tube in accordance with the fourth specific example of the present invention.
Figure 23:
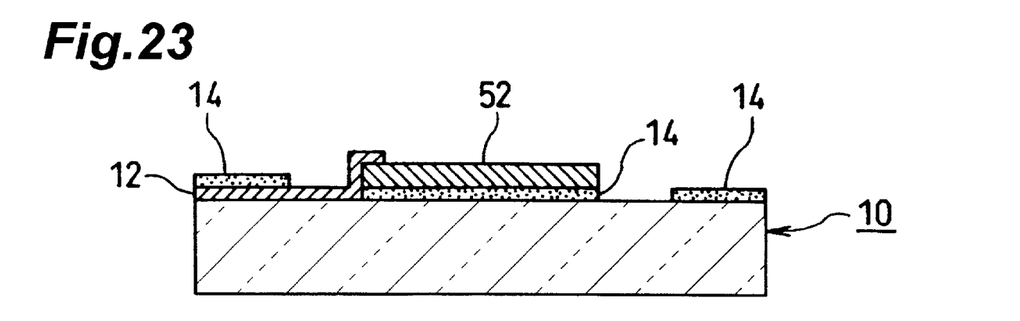
FIG. 23 is a view showing a step of making the electron tube in accordance with the fourth specific example of the present invention.

Subsequently, a Cr film 12 to become an electrode is vapor-deposited on the glass member 10 as shown in FIG. 22, and $SiO_2$ films 14 are formed at their predetermined positions as shown in FIG. 23.

The subsequent processing being similar to the third specific example, two glass members 10 are hot-pressed against each other by use of glass supports 18, and external electrodes 19 are drawn therefrom, whereby an electron tube 50 is formed.

As shown in the above-mentioned first to fourth specific examples, when the method of bonding glass members in accordance with the embodiment is used for bonding glass members together, the bonding surfaces would not easily peel off, and the metal films would not be damaged, whereby it is possible to make an optical window having a favorable reflecting layer or electrode, or an electron tube.

Though the metal film formed on the bonding surface of the first glass member 10 is made of Cr in the above-mentioned embodiment, it is not restricted to Cr. For example, when a film made of Al, Ni, Ti, Mo, or Ta is formed, two glass members can effectively be bonded together by use of the method of bonding glass members in accordance with this embodiment.

Also, though CVD technique is used as a method of vapor-depositing $SiO_2$ on the bonding surface of the first glass member in the above-mentioned embodiment, other vapor-depositing methods such as PVD technique may be used instead.

Also, though $SiO_2$ is deposited on the whole bonding surface in the above-mentioned embodiment so as to form the $SiO_2$ film 14, if the bonding strength fulfills a desirable strength, the $SiO_2$ film 14 may be formed on a part of the bonding surface instead of the whole surface thereof and then subjected to hot-pressing.

Further, though specific examples using glass and group III-V compound semiconductors as a member made of glass or the like to be bonded to a glass member are shown in the above-mentioned embodiment, a member made of sapphire, spinel, ceramics, silicon, or the like may be considered as a member made of glass or the like which can bond the glass member in this method. When bonding a glass member to such a member, the two members can firmly be bonded together in the method in accordance with the above-mentioned embodiment.

Industrial Applicability

The method of bonding glass members in accordance with the present invention can widely be used when making electron tubes, optical windows, and the like such as those shown in the above-mentioned embodiment, for example.

What is claimed is:

1. A method of bonding glass members comprising:
   forming a metal film on at least a part of a bonding surface of a first member formed from a material selected from the group consisting of glass, sapphire, spinel, silicon, and group III-V compound semiconductors;
   forming an $SiO_2$ film on at least a part of said metal film; and then
   hot-pressing a second glass member against said bonding surface to bond said first member to said second glass member.

2. A method of bonding glass members according to claim 1, wherein said $SiO_2$ film is formed by CVD technique (chemical vapor deposition technique).

3. A method of bonding glass members according to claim 1, wherein said second glass member is made of glass containing at least one kind of alkali element, and, wherein the difference between the coefficient of thermal expansion of said first member and the coefficient of thermal expansion of said second glass member is within the range of $-1.0 \times 10{-6}$ to $+1.0 \times 10^{-6\circ}$ C.

4. A method of bonding glass members according to claim 1, wherein said hot-pressing is performed at an approximate yielding point temperature of said second glass member and with a pressure of about 100–200 $g/cm^2$.

5. A method according to claim 1, wherein said metal film comprises Cr.

6. A method according to claim 5, wherein said Cr film comprises a thickness of about 1000 Å.

7. A method according to claim 1, wherein said $SiO_2$ film comprises a thickness of about 1000 Å.

8. A method according to claim 1, wherein said hot-pressing comprises:
   arranging said first member and second glass member such that one member is above said other member;
   eliminating any gas clinging on surfaces of said first member and second glass member;
   stacking said first member and second glass member;
   holding said first member and second glass member in close contact with each other; and
   forming a bonded body with said first member and second glass member.

9. A method according to claim 1, wherein said first member comprises a planar surface.

10. A method according to claim 1, further comprising:
    etching said metal film and said $SiO_2$ film; and
    forming an electrode metal material on at least a portion of said bonding surface.

11. A method of bonding glass members comprising:
    forming a first metal film on at least a part of a first surface of a plurality of first members formed from a material selected from the group consisting of glass, sapphire, spinel, silicon, and group III-V compound semiconductors, said first members having second surfaces opposite said first surfaces;
    forming a first $SiO_2$ film on at least a part of said first metal film; and
    hot-pressing said first surfaces of said first members against said second surfaces of said first members and a second glass member to bond said plurality of first members to each other and said second glass member.

12. A method according to claim 11, further comprising:
    cutting the bonded members in a direction transverse to said first and second surfaces to form cut bonded members.

13. A method according to claim 12, further comprising:

forming a second metal film on at least a part of first cut bonded member surfaces said cut bonded members having second cut bonded members surfaces opposite said first cut bonded members surfaces;

forming a second $SiO_2$ film on at least a part of said second metal film of each cut bonded member; and hot-pressing said first cut bonded member surfaces against said second cut bonded member surfaces and a third glass member to bond said plurality of cut bonded members to each other and said third glass member.

14. A method according to claim 13, further comprising:

cutting the cut bonded members in a direction transverse to said first and second cut bonded member surfaces.

15. A method of bonding glass members comprising:

forming a first metal film on at least a part of a first surface of a plurality of first members formed from a material selected from the group consisting of glass, sapphire, spinel, ceramics, silicon, and group III-V compound semiconductors, said first members having second surfaces opposite said first surfaces;

forming a first $SiO_2$ film on at least a part of said first metal film; and hot-pressing said first surfaces of said first members against said second surfaces of said first members and a second glass member to bond said plurality of first members to each other and said second glass member; and cutting the bonded members in a direction transverse to said first and second surfaces to form cut bonded members.

16. A method according to claim 15, further comprising:

forming a second metal film on at least a part of first cut bonded member surfaces, said cut bonded members having second cut bonded member surfaces opposite said first cut bonded member surfaces;

forming a second $SiO_2$ film on at least a part of said second metal film of each cut bonded member; and hot-pressing said first cut bonded member surfaces against said second cut bonded member surfaces and a third glass member to bond said plurality of cut bonded members to each other and said third glass member.

17. A method according to claim 16, further comprising:

cutting the cut bonded members in a direction transverse to said first and second cut bonded member surfaces.

* * * * *